Jan. 12, 1943.    R. J. DOUGHERTY    2,307,740
TEMPERATURE NORMALIZER FOR STORAGE WATER HEATERS
Filed Dec. 7, 1940
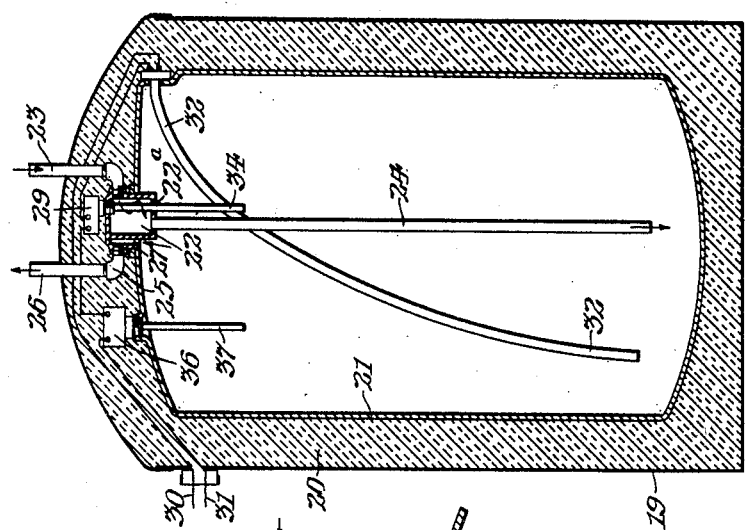
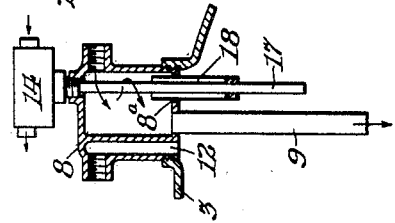
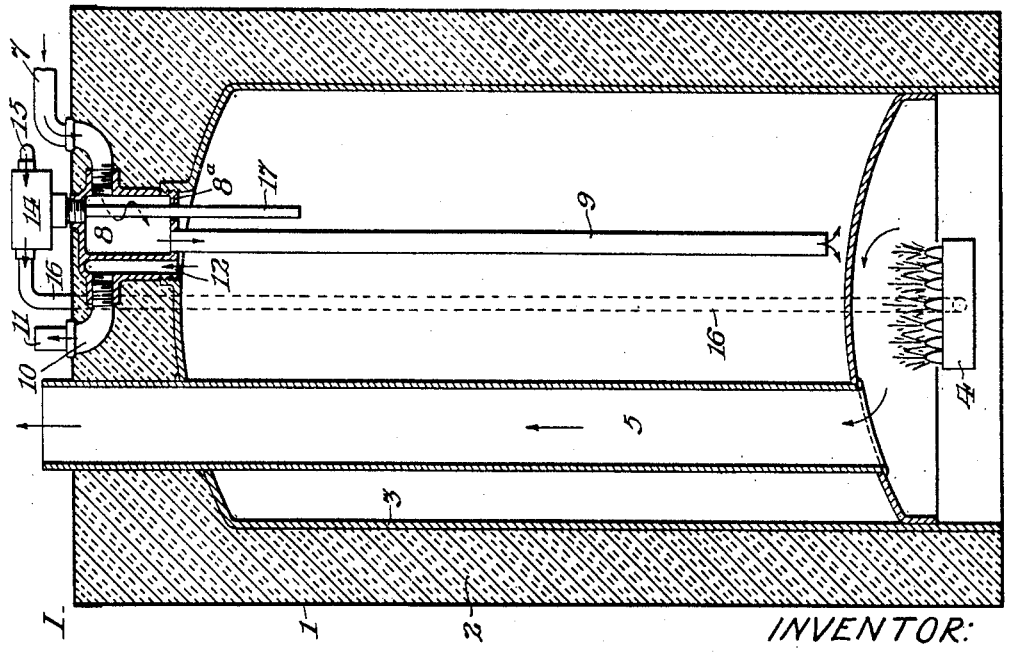
INVENTOR:
ROBERT J. DOUGHERTY,
BY Arthur E. Paige
Attorney.

Patented Jan. 12, 1943

2,307,740

UNITED STATES PATENT OFFICE 2,307,740

TEMPERATURE NORMALIZER FOR STORAGE WATER HEATERS

Robert J. Dougherty, Ambler, Pa., assignor to John Wood Manufacturing Company, Inc., Conshohocken, Pa., a corporation of Delaware Application December 7, 1940, Serial No. 369,072

3 Claims. (Cl. 236—33)

This invention relates to a new and useful improvement in temperature normalizers for storage water heaters.

Such a heater, using a gas burner as the heating medium, is usually designed so that the flame of the burner plays on the bottom of the tank containing the water; so that the tank bottom forms the primary heating surface. The flue gases then travel up the sides and over the top of the water container, in what are termed external flue heaters, or up a flue extending through the water container, in what are termed internal flue heaters.

It is usual to control the supply of gas to heaters of both types aforesaid by a suitable thermostat, usually located near the bottom of the heater. Ordinarily such a heater is included in the piping system of a house and has a cold water inlet connected to a municipal water supply pipe or other source and a hot water outlet connected to the dispensing faucets throughout the house. In such arrangement, withdrawing water from the hot water outlet permits cold water to flow into the container through the cold water inlet.

After the content of a storage water heater of the prior art is raised from the water inlet temperature to the predetermined temperature for which the thermostatic control is set, when a draw of hot water is made of, say, one-half the contents of the heater, the thermostatic element will call for heat. Due to the above-described nature of the heating surfaces in heaters of the prior art, the upper half of the heater contents, already at the desired temperature, will receive an increment of heat and the temperature of this water in the upper half of the container will be raised over and above the thermostatic cut-out point, by reason of the fact that the thermostat is located near the bottom of the heater and is affected by the cold water replacing the hot water drawn from the upper part of the container. Such increasing of the temperature of the water in the upper part of the heater is known in the trade as "overbuilding", and is considered generally to be an undesirable feature. Temperature overbuilding in water heaters varies considerably with the construction, size, shape, and insulation of the heater.

The disadvantages of such overbuilding are, first, that it results in a non-uniform temperature of water withdrawn from the heater; second, when the overbuilding is pronounced, it results in the blowing of safety fuse plugs or the functioning of equivalent safety devices, which necessitates service calls for the heater; and, third, such higher water temperatures at the top of the tank have a deleterious effect on the galvanized surfaces of the containers.

Moreover, in water heaters of the prior art, in order to permit removal and replacement of the controlling thermostat without letting water out of the container, each such thermostat is placed in what is termed a thermostat "well," viz., a tubular casing which may be permanently secured extending through the side wall of the container, and provided with a cap which may be removed to render the thermostat accessible. Such ordinary thermostats operate in accordance with the temperature of the water in the container immediately adjoining the well in which the thermostat is encased. If such a thermostat is set at, say, 140° F. so that it will shut off the supply of heat at that temperature, and a large quantity of hot water is withdrawn at one time with corresponding influx of cold water, a considerable time may elapse before the thermostat reacts to the change of temperature, because of the seclusion of the thermostat in its well which must first absorb the temperature before it can transfer it to the thermostat. A similar differential lag occurs when the water in the container reaches the predetermined temperature, also due to the necessity of exchange of temperature through the thermostat well, etc. Therefore, it is characteristic of heaters thus controlled that the water stored and available at any instant may be hotter or very much colder than the temperature for which the thermostat is set.

Storage water heaters, utilizing electrical resistance units as the source of heat are similarly controlled by electric thermostats extending through the side walls of the water containers in such thermostat wells.

It is characteristic of my invention that whatever heating means may be employed, it is controlled by a single thermostat which is not enclosed in a thermostat well but is exposed to both the cold water at the cold water inlet and extends into the hot water in the upper part of the container. The effect of that arrangement is that instantly upon the withdrawal of any hot water, the cold water flowing into the inlet causes the thermostat to immediately turn on the heat. As the water is heated and rises to the top of the container, it affects the same thermostat, so that when the hot water reaches the temperature for which the thermostat is set, the latter instantly stops the supply of heat.

Another feature of my invention is that even if only a small amount of hot water be withdrawn from the heater and the general temperature of the water at the top of the heater be as little as one degree below the cut-out point, the thermostatic element will function to assure that the temperature of the water be raised to that small degree. Another feature of advantage of my invention is that the high efficiency advantages of stratification of the water in the tank are retained, which results in the achievement of a lower stand-by period by reason of the control of the top temperature.

My invention includes the various novel features of construction, arrangement, and method of operation hereinafter more definitely specified.

In said drawing:

Fig. I is a vertical sectional view of a gas fired storage water heater, of the internal flue type.

Fig. II is a fragmentary sectional view of the upper portion of the water container shown in Fig. I differing from the latter in that the stem of the thermostat has a vertically adjustable receptacle for cold water from the cold water inlet, extending downwardly into the container so that more of the thermostat stem may be subjected to the cold water than in the form shown in Fig. I.

Fig. III is a vertical sectional view of a storage water heater in which the heating medium is an electrical resistance.

Referring to Fig. I; the outer casing 1, conveniently formed of thin sheet metal, encircles and holds the jacket of insulating material 2 in contact with the outer surface of the water container 3 which is arranged to be heated by the gas burner 4 from which the products of combustion escape up through the internal flue 5. The pipe 7 leads from a supply of cold water (for instance a municipal service main) to the cold water fitting 8 from which what is termed a dip pipe 9 extends to near the bottom of the container to deliver the cold water adjoining the bottom of the container. The hot water outlet 10 is connected with the dispensing piping 11 and in communication with the interior of the container 3 through the passageway 12.

The ordinary thermostat controlling device includes in the fitting 14 a valve controlling the passage of gas from the supply inlet 15 to the pipe 16 leading to said burner 4. The tubular thermostat stem 17, containing the thermostatic couple, extends downwardly from the valve casing 14 through the cold water inlet fitting 8 and into the upper portion of the container 3, but extends loosely through the opening 8ª in the bottom of the cold water fitting.

The effect of that arrangement shown in Fig. I is that immediately upon withdrawal of hot water through the outlet 10, there is a corresponding inflow of cold water through the inlet fitting 8 in direct contact with the upper portion of the stem 17 of the thermostat, so that the effect is to practically instantaneously turn on the gas to the burner 4 whenever hot water is withdrawn. However, the extension of the thermostat 17 into the hottest part of the water in the container 3 insures that immediately upon the rise of temperature of that water to that for which the thermostat is set, the valve will close and shut off the supply of gas to the burner 4.

Fig. II differs from Fig. I only in that there is a vertically adjustable receptacle 18 for cold water, telescopically fitted around the thermostat stem 17 and vertically adjustable to expose more of that stem to the effect of the cold water than in the form shown in Fig. I.

Referring to Fig. III; the outer casing 19, conveniently formed of thin sheet metal, holds the jacket of insulating material 20 in contact with the outer surface of the water container 21.

The cold water inlet fitting 22 is connected with the cold water supply pipe 23 and has the dip pipe 24 extending to near the bottom of the container 21, to deliver the cold water adjoining the bottom of the container. The hot water outlet 25 is connected with the dispensing piping 26 and in communication with the interior of the container 21 through the passageway 27.

The electric thermostat controlling device includes in the fitting 29 an electric switch controlling an electrical energizing circuit including the exterior conductors 30 and 31. That circuit includes the electrical resistance element 32 which extends to near the bottom of the water container 21. The tubular thermostat stem 34, containing the thermostatic couple, extends downwardly from the switch casing 29 through the cold water inlet fitting 22 and into the upper portion of the container 21, but extends loosely through the opening 22ª in the bottom of the cold water fitting 22. Of course, the thermostat in Fig. III may be provided with a vertically adjustable receptacle for cold water telescopically fitted around the stem 34, like the receptacle 18 shown in Fig. II.

In some portions of the United States the authorities controlling the installation of water heaters require such a heater to have a safety thermostat which will stop the heating action, if and when the water in the container reaches a predetermined temperature. Therefore, I have shown in Fig. III a thermostat including a switch casing 36 with a tubular thermostatic stem 37 containing the thermostatic couple and extending downwardly into the hot water in the upper portion of the casing 21, to break the electric energizing circuit aforesaid, if and when the water reaches the temperature for which the thermostat switch 36 is set.

The forms of my invention shown are advantageous not only in that the cost of manufacturing and installation of the thermostat wells of the prior art is saved, but also in that there is but one opening into the water container required to install the cold water inlet, hot water outlet, and the thermostatic means for controlling the same, and that opening is in the top of the container where it may be conveniently formed.

However, I do not desire to limit myself to the precise details of construction, arrangement, or method of operation herein set forth, as it is obvious that various modifications may be made therein without departing from the essential features of my invention, as defined in the appended claims.

I claim:

1. In a water heater; the combination with a water container; of heating means for the water in the container; a cold water inlet at the upper part of the container; a hot water outlet from the container; and a single thermostat having a portion of its thermostatic couple subjected to the temperature of the cold water at said inlet, and having another portion thereof subjected continually only to the temperature of the heated water in the upper part of the container; whereby, when hot water is withdrawn from said outlet, a corresponding amount of cold water flows into said inlet and operates the thermostat to initiate the operation of the heating means; and when the heated water reaches the temperature for which the thermostat is set it operates to terminate the operation of the heating means.

2. In a water heater; the combination with a water container; of heating means for the water in the container, a cold water inlet at the upper part of the container; a hot water outlet from the container; and a single thermostat having a portion of its thermostatic couple subjected to the temperature of the cold water at said inlet and having another portion thereof subjected continually only to the temperature of the heated water in the upper part of the container; whereby, when hot water is withdrawn from said outlet, a corresponding amount of cold water flows into said inlet and operates the thermostat to initiate the operation of the heating means; and when the heated water reaches the temperature for which the thermostat is set it operates to terminate the operation of the heating means; including a single fitting containing said inlet and outlet and supporting the thermostat.

3. A structure as in claim 1; including a receptacle for cold water in communication with the cold water inlet and adjustable longitudinally on the stem of the thermostat; whereby, the extent of the portion of the thermostatic couple subjected to the temperature of the cold water at said inlet may be adjustably varied.

ROBERT J. DOUGHERTY.